US011675444B1

United States Patent
Hobson-Dupont (10) Patent No.: US 11,675,444 B1
(45) Date of Patent: Jun. 13, 2023

(54) POSITION TRACKING SYSTEM EMPLOYING EXTERNAL MAGNETIC FIELD

(71) Applicant: Maximillian Hobson-Dupont, Oakland, CA (US)

(72) Inventor: Maximillian Hobson-Dupont, Oakland, CA (US)

( * ) Notice: Subject to any disclaimer, the term of this patent is extended or adjusted under 35 U.S.C. 154(b) by 0 days.

(21) Appl. No.: 17/008,514

(22) Filed: Aug. 31, 2020

Related U.S. Application Data (63) Continuation of application No. 15/206,246, filed on Jul. 9, 2016, now Pat. No. 10,761,616.

(51) Int. Cl.
| | | |
|---|---|---|
| *G06F 3/0346* | (2013.01) |
| *G06F 17/16* | (2006.01) |
| *G06F 3/038* | (2013.01) |
| *G01D 5/14* | (2006.01) |

(52) U.S. Cl.
CPC ............ *G06F 3/0346* (2013.01); *G06F 3/038* (2013.01); *G06F 3/0383* (2013.01); *G06F 17/16* (2013.01); *G01D 5/145* (2013.01)

(58) Field of Classification Search
CPC .............. G01R 33/5613; G01R 33/50; G01R 33/5602; G01R 33/5616; G01R 33/543; G01R 33/546
USPC ........................................................ 324/314
See application file for complete search history.

(56) References Cited

U.S. PATENT DOCUMENTS

| | | | |
|---|---|---|---|
| 4,787,051 A | 11/1988 | Olson | |
| 5,150,056 A | 9/1992 | Wilcock | |
| 6,313,755 B1 | 11/2001 | Hetmaniak | |
| 6,720,921 B2 * | 4/2004 | Ripingill, Jr. | G01S 5/0247 342/464 |
| 6,879,160 B2 * | 4/2005 | Jakab | G01R 33/285 324/309 |
| 7,019,733 B2 | 3/2006 | Koay | |
| 7,034,804 B2 * | 4/2006 | Lai | G06F 3/03543 345/157 |

(Continued)

OTHER PUBLICATIONS

Crassidis, J.L., Markley, F.L. and Cheng, Y., 2007. Survey of nonlinear attitude estimation methods. Journal of guidance, control, and dynamics, 30(1), pp. 12-28. (Year: 2007).

(Continued)

*Primary Examiner* — Christopher P McAndrew
(74) *Attorney, Agent, or Firm* — Loginov & Associates, PLLC; William A. Loginov (57) ABSTRACT

A common method for providing user-input to an electronic system consists of tracking the position and motion of an object moved by the user and conveying this information to the electronic system. One embodiment of a positional tracking system for an object has an external and stationary magnetic-field emitter, a magnetic-field sensor which moves with the tracked object, and a microprocessor that compares magnetic-field intensity measurements taken by the sensor and compares it to magnetic-field characteristics defined for the external magnetic field emitter. A nonlinear equation solver, particle filter, or other method is used to determine the position of the sensor in the magnetic field. In this way the position of an object can be tracked using a single magnetic field emission source. This positional information can be combined with an inertial tracking system to mitigate drift errors.

21 Claims, 7 Drawing Sheets

(56) References Cited

U.S. PATENT DOCUMENTS

| | | | |
|---|---|---|---|
| 7,688,307 | B1 | 3/2010 | Tsyrganovich |
| 7,830,360 | B2 | 11/2010 | Jeng |
| 8,441,434 | B2 | 5/2013 | Vaeaenaenen |
| 9,474,465 | B2 * | 10/2016 | Ashe ............... A61B 8/4254 |
| 2003/0222851 | A1 * | 12/2003 | Lai .................. G06F 3/03543 |
| | | | 345/163 |
| 2010/0079376 | A1 | 4/2010 | Lou |
| 2013/0265225 | A1 | 10/2013 | Nasiri |
| 2014/0180627 | A1 | 6/2014 | Naguib |
| 2016/0252977 | A1 | 9/2016 | Liberty |

OTHER PUBLICATIONS

De Marina, H.G., Pereda, F.J., Giron-Sierra, J.M. and Espinosa, F., 2011. UAV attitude estimation using unscented Kalman filter and TRIAD. IEEE Transactions on Industrial Electronics, 59(11), pp. 4465-4474. (Year: 2011).

Fang, J., Sun, H., Cao, J., Zhang, X. and Tao, Y., 2011. A novel calibration method of magnetic compass based on ellipsoid fitting. IEEE Transactions on Instrumentation and Measurement, 60(6), pp. 2053-2061. (Year: 2011).

Gou, Xiao-Fan; Yang, Yong; Zheng, Xiao-Jing; Analytic Expression of Magnet Field Distribution of Rectangular Permanent Magnets, Applied Mathematics and Mechanics (English Edition), Mar. 2004, vol. 25, No. 3, Shanghai University, Shanghai, China.

Zhao, H. and Wang, Z., 2011. Motion measurement using inertial sensors, ultrasonic sensors, and magnetometers with extended kalman filter for data fusion. IEEE Sensors Journal, 12(5), pp. 943-953. (Year: 2011).

* cited by examiner

$$\begin{aligned}
B_x = -\frac{1}{4\pi}\Bigg(\mu M \Bigg(
&-\frac{1}{4}\frac{(-4L+8S_x)L S_x}{\sqrt{4S_x^2-4LS_x+L^2+4S_y^2+4S_yW+W^2}\left(-2S_y-W+\sqrt{4S_x^2-4LS_x+L^2+4S_y^2+4S_yW+W^2}\right)}\\
&+\frac{1}{4}\frac{(8S_x+4L)L S_x}{\sqrt{4S_x^2+4LS_x+L^2+4S_y^2-4S_yW+W^2}\left(-2S_y+W+\sqrt{4S_x^2+4LS_x+L^2+4S_y^2-4S_yW+W^2}\right)}\\
&+\frac{1}{4}\frac{(-4L+8S_x)L S_x}{\sqrt{4S_x^2-4LS_x+L^2+4S_y^2-4S_yW+W^2}\left(-2S_y+W+\sqrt{4S_x^2-4LS_x+L^2+4S_y^2-4S_yW+W^2}\right)}\\
&-\frac{1}{4}\frac{(8S_x+4L)L S_x}{\sqrt{4S_x^2+4LS_x+L^2+4S_y^2+4S_yW+W^2}\left(-2S_y-W+\sqrt{4S_x^2+4LS_x+L^2+4S_y^2+4S_yW+W^2}\right)}\\
&+\frac{1}{16}\frac{W(8S_x+4L)}{\sqrt{4S_x^2+4LS_x+L^2+4S_y^2+4S_yW+W^2}}-\frac{1}{8}\frac{S_y(8S_x+4L)}{\sqrt{4S_x^2+4LS_x+L^2+4S_y^2-4S_yW+W^2}}\\
&-\frac{1}{2}\ln\left(-2S_y-W+\sqrt{4S_x^2-4LS_x+L^2+4S_y^2+4S_yW+W^2}\right)L\\
&+\ln\left(-2S_y-W+\sqrt{4S_x^2-4LS_x+L^2+4S_y^2+4S_yW+W^2}\right)S_x-\frac{1}{16}\frac{W(-4L+8S_x)}{\sqrt{4S_x^2-4LS_x+L^2+4S_y^2-4S_yW+W^2}}\\
&+\ln\left(-2S_y+W+\sqrt{4S_x^2-4LS_x+L^2+4S_y^2-4S_yW+W^2}\right)S_x\\
&+\frac{1}{2}\ln\left(-2S_y+W+\sqrt{4S_x^2-4LS_x+L^2+4S_y^2-4S_yW+W^2}\right)L-\frac{1}{16}\frac{W(-4L+8S_x)}{\sqrt{4S_x^2-4LS_x+L^2+4S_y^2+4S_yW+W^2}}\\
&+\frac{1}{16}\frac{W(8S_x+4L)}{\sqrt{4S_x^2+4LS_x+L^2+4S_y^2-4S_yW+W^2}}+\ln\left(-2S_y+W+\sqrt{4S_x^2+4LS_x+L^2+4S_y^2-4S_yW+W^2}\right)S_x\\
&+\frac{1}{8}\frac{S_y(8S_x+4L)}{\sqrt{4S_x^2+4LS_x+L^2+4S_y^2+4S_yW+W^2}}-\frac{1}{2}\ln\left(-2S_y-W+\sqrt{4S_x^2+4LS_x+L^2+4S_y^2+4S_yW+W^2}\right)L\\
&-\frac{1}{8}\frac{S_y(-4L+8S_x)}{\sqrt{4S_x^2-4LS_x+L^2+4S_y^2+4S_yW+W^2}}+\frac{1}{8}\frac{S_y(-4L+8S_x)}{\sqrt{4S_x^2-4LS_x+L^2+4S_y^2-4S_yW+W^2}}\\
&+\frac{1}{2}\ln\left(-2S_y+W+\sqrt{4S_x^2+4LS_x+L^2+4S_y^2-4S_yW+W^2}\right)L\\
&-\ln\left(-2S_y-W+\sqrt{4S_x^2+4LS_x+L^2+4S_y^2+4S_yW+W^2}\right)S_x\\
&-\frac{1}{4}\frac{(8S_x+4L)S_x^2}{\sqrt{4S_x^2+4LS_x+L^2+4S_y^2+4S_yW+W^2}\left(-2S_y-W+\sqrt{4S_x^2+4LS_x+L^2+4S_y^2+4S_yW+W^2}\right)}\\
&-\frac{1}{16}\frac{(8S_x+4L)L^2}{\sqrt{4S_x^2+4LS_x+L^2+4S_y^2+4S_yW+W^2}\left(-2S_y-W+\sqrt{4S_x^2+4LS_x+L^2+4S_y^2+4S_yW+W^2}\right)}\\
&+\frac{1}{4}\frac{(-4L+8S_x)S_x^2}{\sqrt{4S_x^2-4LS_x+L^2+4S_y^2+4S_yW+W^2}\left(-2S_y-W+\sqrt{4S_x^2-4LS_x+L^2+4S_y^2+4S_yW+W^2}\right)}\\
&+\frac{1}{16}\frac{(-4L+8S_x)L^2}{\sqrt{4S_x^2-4LS_x+L^2+4S_y^2+4S_yW+W^2}\left(-2S_y-W+\sqrt{4S_x^2-4LS_x+L^2+4S_y^2+4S_yW+W^2}\right)}\\
&+\frac{1}{4}\frac{(8S_x+4L)S_x^2}{\sqrt{4S_x^2+4LS_x+L^2+4S_y^2-4S_yW+W^2}\left(-2S_y+W+\sqrt{4S_x^2+4LS_x+L^2+4S_y^2-4S_yW+W^2}\right)}\\
&+\frac{1}{16}\frac{(8S_x+4L+)L^2}{\sqrt{4S_x^2+4LS_x+L^2+4S_y^2-4S_yW+W^2}\left(-2S_y+W+\sqrt{4S_x^2+4LS_x+L^2+4S_y^2-4S_yW+W^2}\right)}\\
&-\frac{1}{4}\frac{(-4L+8S_x)S_x^2}{\sqrt{4S_x^2-4LS_x+L^2+4S_y^2-4S_yW+W^2}\left(-2S_y+W+\sqrt{4S_x^2-4LS_x+L^2+4S_y^2-4S_yW+W^2}\right)}\\
&-\frac{1}{16}\frac{(-4L+8S_x)L^2}{\sqrt{4S_x^2-4LS_x+L^2+4S_y^2-4S_yW+W^2}\left(-2S_y+W+\sqrt{4S_x^2-4LS_x+L^2+4S_y^2-4S_yW+W^2}\right)}\Bigg)H\Bigg)
\end{aligned}$$

FIG. 3

$$B_y = -\frac{1}{4\pi}\left(\mu M \left(\frac{1}{8}\frac{S_y(8S_y+4W)}{\sqrt{4S_x^2+4LS_x+L^2+4S_y^2+4S_yW+W^2}} + \frac{1}{4}\sqrt{4S_x^2+4LS_x+L^2+4S_y^2+4S_yW+W^2}\right.\right.$$

$$+\frac{1}{16}\frac{W(8S_y+4W)}{\sqrt{4S_x^2+4LS_x+L^2+4S_y^2+4S_yW+W^2}} - \frac{1}{2}\frac{\left(-2+\frac{1}{2}\frac{8S_y+4W}{\sqrt{4S_x^2+4LS_x+L^2+4S_y^2+4S_yW+W^2}}\right)S_x^2}{-2S_y-W+\sqrt{4S_x^2+4LS_x+L^2+4S_y^2+4S_yW+W^2}}$$

$$-\frac{1}{2}\frac{\left(-2+\frac{1}{2}\frac{8S_y+4W}{\sqrt{4S_x^2+4LS_x+L^2+4S_y^2+4S_yW+W^2}}\right)LS_x}{-2S_y-W+\sqrt{4S_x^2+4LS_x+L^2+4S_y^2+4S_yW+W^2}}$$

$$-\frac{1}{8}\frac{\left(-2+\frac{1}{2}\frac{8S_y+4W}{\sqrt{4S_x^2+4LS_x+L^2+4S_y^2+4S_yW+W^2}}\right)L^2}{-2S_y-W+\sqrt{4S_x^2+4LS_x+L^2+4S_y^2+4S_yW+W^2}}$$

$$-\frac{1}{2}\frac{\left(-2+\frac{1}{2}\frac{8S_y+4W}{\sqrt{4S_x^2+4LS_x+L^2+4S_y^2+4S_yW+W^2}}\right)LS_x}{-2S_y-W+\sqrt{4S_x^2+4LS_x+L^2+4S_y^2+4S_yW+W^2}}$$

$$-\frac{1}{8}\frac{\left(-2+\frac{1}{2}\frac{8S_y+4W}{\sqrt{4S_x^2+4LS_x+L^2+4S_y^2+4S_yW+W^2}}\right)L^2}{-2S_y-W+\sqrt{4S_x^2+4LS_x+L^2+4S_y^2+4S_yW+W^2}} - \frac{1}{8}\frac{S_y(8S_y+4W)}{\sqrt{4S_x^2-4LS_x+L^2+4S_y^2+4S_yW+W^2}}$$

$$-\frac{1}{4}\sqrt{4S_x^2-4LS_x+L^2+4S_y^2+4S_yW+W^2} - \frac{1}{16}\frac{W(8S_y+4W)}{\sqrt{4S_x^2-4LS_x+L^2+4S_y^2+4S_yW+W^2}}$$

$$+\frac{1}{2}\frac{\left(-2+\frac{1}{2}\frac{8S_y+4W}{\sqrt{4S_x^2-4LS_x+L^2+4S_y^2+4S_yW+W^2}}\right)S_x^2}{-2S_y-W+\sqrt{4S_x^2-4LS_x+L^2+4S_y^2+4S_yW+W^2}}$$

$$-\frac{1}{2}\frac{\left(-2+\frac{1}{2}\frac{8S_y+4W}{\sqrt{4S_x^2-4LS_x+L^2+4S_y^2+4S_yW+W^2}}\right)LS_x}{-2S_y-W+\sqrt{4S_x^2-4LS_x+L^2+4S_y^2+4S_yW+W^2}}$$

$$+\frac{1}{8}\frac{\left(-2+\frac{1}{2}\frac{8S_y+4W}{\sqrt{4S_x^2-4LS_x+L^2+4S_y^2+4S_yW+W^2}}\right)L^2}{-2S_y-W+\sqrt{4S_x^2-4LS_x+L^2+4S_y^2+4S_yW+W^2}} - \frac{1}{8}\frac{S_y(8S_y-4W)}{\sqrt{4S_x^2+4LS_x+L^2+4S_y^2-4S_yW+W^2}}$$

$$-\frac{1}{4}\sqrt{4S_x^2+4LS_x+L^2+4S_y^2-4S_yW+W^2} + \frac{1}{16}\frac{W(8S_y-4W)}{\sqrt{4S_x^2+4LS_x+L^2+4S_y^2-4S_yW+W^2}}$$

$$+\frac{1}{2}\frac{\left(-2+\frac{1}{2}\frac{8S_y+4W}{\sqrt{4S_x^2+4LS_x+L^2+4S_y^2-4S_yW+W^2}}\right)S_x^2}{-2S_y+W+\sqrt{4S_x^2+4LS_x+L^2+4S_y^2-4S_yW+W^2}}$$

$$+\frac{1}{2}\frac{\left(-2+\frac{1}{2}\frac{8S_y-4W}{\sqrt{4S_x^2+4LS_x+L^2+4S_y^2-4S_yW+W^2}}\right)LS_x}{-2S_y+W+\sqrt{4S_x^2+4LS_x+L^2+4S_y^2-4S_yW+W^2}}$$

$$+\frac{1}{8}\frac{\left(-2+\frac{1}{2}\frac{8S_y-4W}{\sqrt{4S_x^2+4LS_x+L^2+4S_y^2-4S_yW+W^2}}\right)L^2}{-2S_y+W+\sqrt{4S_x^2+4LS_x+L^2+4S_y^2-4S_yW+W^2}} + \frac{1}{8}\frac{S_y(8S_y-4W)}{\sqrt{4S_x^2-4LS_x+L^2+4S_y^2-4S_yW+W^2}}$$

$$-\frac{1}{4}\sqrt{4S_x^2-4LS_x+L^2+4S_y^2-4S_yW+W^2} - \frac{1}{16}\frac{W(8S_y-4W)}{\sqrt{4S_x^2-4LS_x+L^2+4S_y^2-4S_yW+W^2}}$$

$$-\frac{1}{2}\frac{\left(-2+\frac{1}{2}\frac{8S_y-4W}{\sqrt{4S_x^2-4LS_x+L^2+4S_y^2-4S_yW+W^2}}\right)S_x^2}{-2S_y+W+\sqrt{4S_x^2-4LS_x+L^2+4S_y^2-4S_yW+W^2}}$$

$$+\frac{1}{2}\frac{\left(-2+\frac{1}{2}\frac{8S_y-4W}{\sqrt{4S_x^2-4LS_x+L^2+4S_y^2-4S_yW+W^2}}\right)LS_x}{-2S_y+W+\sqrt{4S_x^2-4LS_x+L^2+4S_y^2-4S_yW+W^2}}$$

$$\left.\left.-\frac{1}{8}\frac{\left(-2+\frac{1}{2}\frac{8S_y-4W}{\sqrt{4S_x^2-4LS_x+L^2+4S_y^2-4S_yW+W^2}}\right)L^2}{-2S_y+W+\sqrt{4S_x^2-4LS_x+L^2+4S_y^2-4S_yW+W^2}}\right)H\right)$$

POSITION TRACKING SYSTEM EMPLOYING EXTERNAL MAGNETIC FIELD

BACKGROUND

This application relates to motion tracking systems, particularly to that of user-interface devices.

PRIOR ART

The following is a tabulation of some prior art that presently appears relevant:

U.S. Patents

| Pat. No. | Kind Code | Issue Date | Patentee |
|---|---|---|---|
| 7,019,733 | B2 | 2006 Mar. 28 | Koay |
| 7,688,307 | B1 | 2010 Mar. 30 | Tsyrganovish |
| 4,787,051 | A | 1988 Nov. 22 | Olson |
| 7,830,360 | B2 | 2010 Nov. 9 | Jeng |
| 8,441,434 | B2 | 2013 May 14 | Vaananen |

U.S. patent application Publications

| Publication Nr. | Kind Code | Issue Date | Applicant |
|---|---|---|---|
| 20100079376 | A1 | 2010 Apr. 1 | Lou |

Nonpatent Literature Documents

*Goa, X, Yang, Y., Zheng, X Analytic Expression of Magnetic Field Distribution of Rectangular Permanent Magnets Applied Mathematics and Mechanics*, Vol 25, no. 3 (Mar. 2004) 297-306

There exist a number of devices that track their own motion imparted to them by a person for the purpose of providing a means for an interface between an electronic system and said person. The type of motion tracked can be any combination of zero to three principal rotations and zero to three principal translations. A typical computer mouse tracks user-induced motion in two translation directions as the mouse is moved over a mostly two dimensional surface such as the top of a desk, and transmits said motion data to a computer that said user wishes to control.

Several motion measurement methodologies presently exist. One such methodology uses one or more rolling elements retained by the mouse assembly, with a portion of said rolling element touching a surface that the mouse is moved over. Additional constraining rollers are used to limit translation of the principal rolling element with respect to the mouse assembly and allow rotation with respect to the mouse assembly. As translation motion is imparted onto the mouse assembly as it lies on a surface, the mouse assembly imparts translation onto the principal rolling element. Friction between the principal rolling element and the surface causes a rotation (rolling) of the rolling element, which is allowed by the constraining rolling elements. The rotation of the constraining rolling elements is tracked by electromechanical means, and related to linear translations. A drawback to this method is that it relies on a mechanical assembly to track motion. The mechanical components require a certain degree of precision, a specific design construction, and can be costly to manufacture. They are subject to wear, the accumulation of dirt, and mechanical failure- resulting in the mouse no longer being able to reliably track motion.

Motion tracking with optical measurements avoids many of the drawbacks of a mechanical system. In such a system, a light source is shined onto a surface at an oblique angle such that small surface features can be resolved by a light sensor. By comparing two such images taken in close succession, relative movement of the device can be determined by comparing the apparent position of specific surface features in each frame. However, the surface that the device moves over must have a sufficient amount of discernable surface features, as well as a sufficiently reflective surface, otherwise consistent measurements are impossible, as would be the case for transparent and smooth surfaces.

US Patent US7019733B2 describes an optic motion measurement system that uses an adjustment mechanism to change the position of the optic source relative to the sensor, allowing the device to be calibrated such that the surface features are detectable by the sensor for transparent surfaces. The disadvantage of this system is that the calibration system requires adjustment from the user, adding inconvenience to its operation. It also adds the manufacturing complexity and failure potential of a mechanical positioning system.

Another methodology uses a combination of accelerometer, gyroscope, and magnetometer sensors, in combination with a microprocessor, to measure user-induced motion. Device orientation can be tracked relative to a reference orientation by integrating gyroscope readings and combining the resulting angular displacement data with magnetometer measurements of Earth's magnetic field to provide an initial orientation reference and correct for drift due to integration error with the gyroscope readings. This tracked orientation can be used to relate acceleration measurements to changes in position in an inertial reference frame. Accelerometers measure gravity as well as linear acceleration. Knowledge of the orientation of the device can be used to remove gravity from the readings, however this would require highly accurate and expensive gyroscopic sensors. Additionally, any other errors (other than gravity) present in the accelerometer measurements are propagated exponentially as it is integrated, causing considerable drift in measured position for systems using all but the most accurate and expensive of accelerometers.

US Patent 768830781 details a cursor controlling device that uses an accelerometer to track user-generated motion. The device attempts to mitigate drift errors by only moving the cursor when measured acceleration magnitudes are greater than a certain threshold, indicating that a user-generated motion event is currently in progress. A drawback to this system is the fact that a single period of uninterrupted user-motion can last for an extended period of time which results in an accumulation of motion error in the system that renders the device unusable for accurate cursor positioning. This is due to both errors from accelerometer output and minute changes in orientation due to motion over an imperfect surface. The former source of error can be mitigated by using higher-quality accelerometers, however this drives up the cost of the system. The latter source of error cannot be mitigated. The device implements an alarm system to alert the user of an excessively large user motion event time period that might result in inaccurate motion measurement. This feature detracts from the user experience, as users are accustomed to conventional computer mice that allow for an indefinite period of user motion. Additionally, the device does not track device rotation, and as a result, measures accelerations solely in a body-frame of reference, and therefore not in an inertial frame, further increasing motion measurement error.

US Patent Application 20100079376A1 details a motion tracking device that uses both accelerometers and gyroscopes. The invention details a method for determining if the device is moving or not, and if it is not in a motion state, the accelerometer readings are used to measure device orientation with gravity. In a motion state, the gyroscopic measurements are used to track device orientation to compute position in an inertial reference frame, and also to account for any gravity measured by the accelerometers due to changes in orientation. However, those familiar in the art recognize that the level of accuracy required for gyroscopes to track minute changes in orientation over a time period reasonable for a typical user-motion event without significant drifting due to incorrect gravity estimation would necessitate costly gyroscopic sensors. Additionally, even if device orientation were perfectly tracked and gravity correctly accounted for, scale-type and other accelerometer measurement errors would result in significant drift if inexpensive, consumer-grade accelerometers were used.

Other methodologies use magnetometers to measure the Earth's magnetic field to measure orientation or supplement gyroscopic orientation measurements. While this is effective for preventing orientation drift due to gyroscopic sensor errors, motion tracking systems based on this technology are still subject to drift due to accelerometer errors, necessitating costly sensors to allow for reasonable user-motion event periods.

Many consumer electronic products such as smartphones have accelerometers, gyroscopes, magnetometers, and a microprocessor. However, because of the low cost and resulting low performance of the sensors, device motion cannot be tracked accurately over extended periods of time using present state-of-the-art methods. Therefore a motion tracking system is sought to enable accurate motion measurement using consumer-grade electronic sensors.

SUMMARY

One embodiment of the present invention consists of a motion tracking system used for user input in electronic systems having an external permanent magnet that generates a known or predictable magnetic field, and an electromechanical assembly consisting of a gyroscope, accelerometer, magnetometer, wireless communication unit, and a microprocessor. Both the electromechanical assembly and permanent magnet reside on a mostly two dimensional surface such as the top of a desk, and remain in proximity to each-other for the duration of use. The microprocessor uses knowledge of the characteristics of the magnetic field emitted by the permanent magnet and compares this to measurements of the magnetic field taken by the magnetometer, and deduces its position relative to the permanent magnet. The microprocessor simultaneously calculates the position of the electromechanical assembly by using dead-reckoning inertial measurement incorporating the gyroscope and magnetometer. The microprocessor then combines both the inertial and magnetic measurements. The combined position measurement is then used as input into the electronic system that the user aims to control. As the electromechanical assembly is moved by the user, the electromechanical assembly measures this motion and sends relative displacement or other motion information to the controlled electronic system to move a cursor on a screen, or control a game.

Advantages

Accordingly several advantages of one or more aspects are as follows: to allow for motion measurements to be made with consumer-grade electronic sensors that have sufficient accuracy for use in user-input devices, and to allow for a smartphone to be used as a user-input device with sufficient motion measurement accuracy to be used to control a cursor. Other advantages of one or more aspects will be apparent from a consideration of the drawings and ensuing description.

DRAWINGS—FIGURES

FIG. 3 shows an equation for calculating the x-component of a magnetic field emitted by the rectangular prism permanent magnet of the first embodiment.

FIG. 4 shows an equation for calculating the y-component of a magnetic field emitted by the rectangular prism permanent magnet of the first embodiment.

| Drawings-Reference Numerals | |
|---|---|
| 10b | permanent magnet |
| 11a | enclosure, bottom |
| 11b | enclosure, top |
| 12 | magnetometer |
| 13 | microprocessor |
| 14 | accelerometer |
| 15 | gyroscope |
| 16 | wireless communication unit |
| 17 | printed circuit board |
| 19 | secondary magnetometer |
| 20 | orientation correction operation |
| 21 | nonlinear equation solver |
| 22 | magnetic field vector generator |
| 23 | distance calculation |
| 24 | plural orientation correction operation |

DETAILED DESCRIPTION—FIGS. 1 THROUGH 4—FIRST EMBODIMENT

Figure 1:
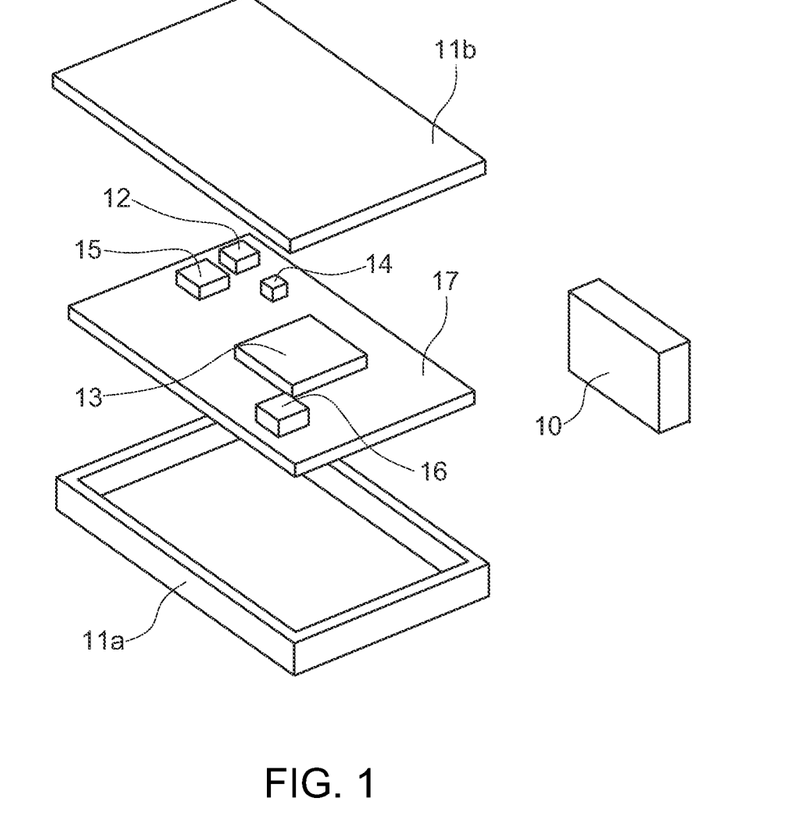
FIG. 1 shows an exploded view of one embodiment.
Figure 2:
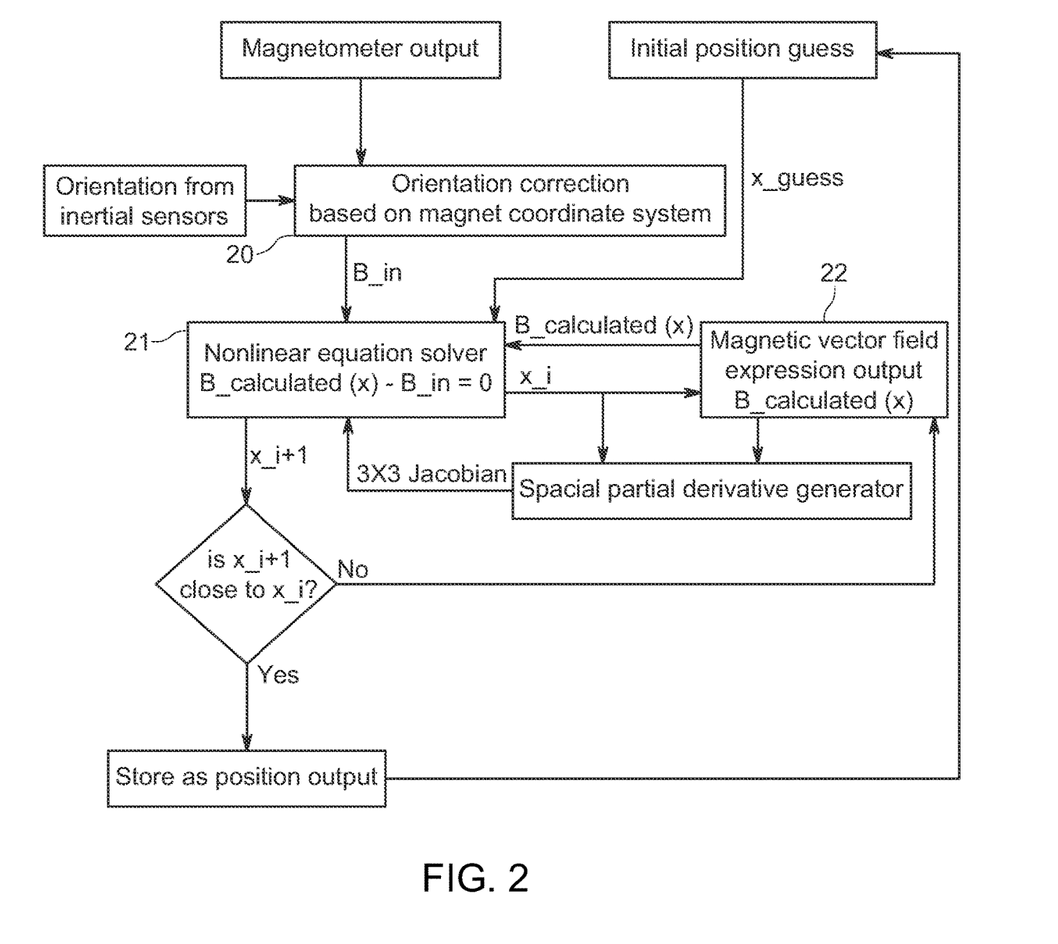
FIG. 2 shows the block diagram detailing how the system determines a position from a combination of magnetometer readings and a knowledge of a surrounding spatially varying magnetic field.

The permanent magnet 10 having a size, shape, and magnetization configuration such that it casts a spatially varying magnetic vector field in the volume surrounding it, with a magnetic field magnitude at a point half of a meter away from the center of the magnet that is several times greater than the earth's magnetic field magnitude at the same point. This can be achieved by a low-grade ceramic permanent magnet being of a rectangular prism shape, having dimensions of 47 mm by 22 mm by 5mm, and being magnetized in a direction through the smallest dimension. The microprocessor 13 having the ability to generate three components of a magnetic vector field of a permanent magnet based on an input of a position and orientation with respect to the external permanent magnet 22, resulting from a set of equations, lookup tables, or a numerical model of the magnet. The user of the system is instructed to begin operation with the electromechanical assembly in a specific orientation with respect to the permanent magnet, which establishes a baseline orientation.

The magnetometer 14 measures the three-dimensional magnetic field vector that is produced by the permanent magnet 10 at the point where the magnetometer 14 is located, and is input into the microprocessor 13. This vector is transformed by the microprocessor with information from the gyroscope and acceleration to correct for any deviation between the present orientation of electromechanical assembly and the reference orientation 20. This can be accomplished by means of quaternions, direction-cosine matrices, Euler angles, or other methods. The microprocessor 13 then uses an iterative nonlinear equation solving method (such as Newton's method) 21 or a particle filter to calculate the position of the electromechanical assembly using both the rotated and measured magnetic field vector, and the microprocessor's knowledge of the magnetic field surrounding the permanent magnet 22.

The motion of the electromechanical assembly is concurrently measured using the accelerometer 14 and gyroscope 13 employing standard inertial measurement methods known by those familiar with the art. The inertial and magnetic measurements a recombined using a Kalman filter or an averaging method to obtain an optimal estimate for acceleration, velocity, and/or position of the electromechanical assembly 11a-17 with respect to the permanent magnet 10.

The Magnetic Field Expression Output 22 is a module of the Microprocessor 13 that can output the three components of the 30 magnetic vector field for a specific magnet design (geometry, material, and magnetization) that is equivalent to the design of the Permanent Magnet 10, at a specific point relative to the Permanent Magnet 10. The source of this output could be a lookup table that derives its data from experimental data or results from a numerical simulation of the magnet. The source of this output could be the direct result of a numerical simulation of the magnet, or an analytic equation. One possible methodology is to derive an analytical expression for the magnetic field surrounding a permanent magnet with a simple geometry such as a rectangular prism. The magnetostatic potential $\vec{\Phi}_m$ at point $\vec{r}$ for a point with a magnetization described by the vector $\vec{m}$ given as $$\vec{\Phi}_m(r) = \frac{\mu_0}{4\pi} \vec{m} \cdot \vec{r} / r^3,$$

with $\mu_0$ being the magnetic permeability of free-space. The magnetostatic potential $\vec{\Phi}_m$ at point $\vec{r}$ for a complete permanent magnet can be found by the integral equation:

$$\vec{\Phi}_m = \iiint \vec{\Phi}_m \, dV.$$

The magnetic field at point $\vec{r}$ can then be found by the equation:

$$\vec{B} = -\nabla \Phi_m(r).$$

For the case of a rectangular prism magnet with length L, width W, and height H, with relatively uniform magnetization M through the length dimension, and the magnetic permeability of free-space $\mu_0$, the magnetic field at a point Sx, Sy, Sz that resides in a plane normal to the height dimension, halfway up the height of the magnet can be computed by the expressions in FIGS. 3 and 4. The expression for Bz is zero in this plane.

Many other methods can be used for deriving magnetic field expressions for permanent magnets. Gou et. al. (2004) detail a method for calculating magnetic field components for rectangular-prism permanent magnets at any arbitrary point surrounding the magnet. They also extend their expression for use with a stack of rectangular prism permanent magnets.

Figure 5:
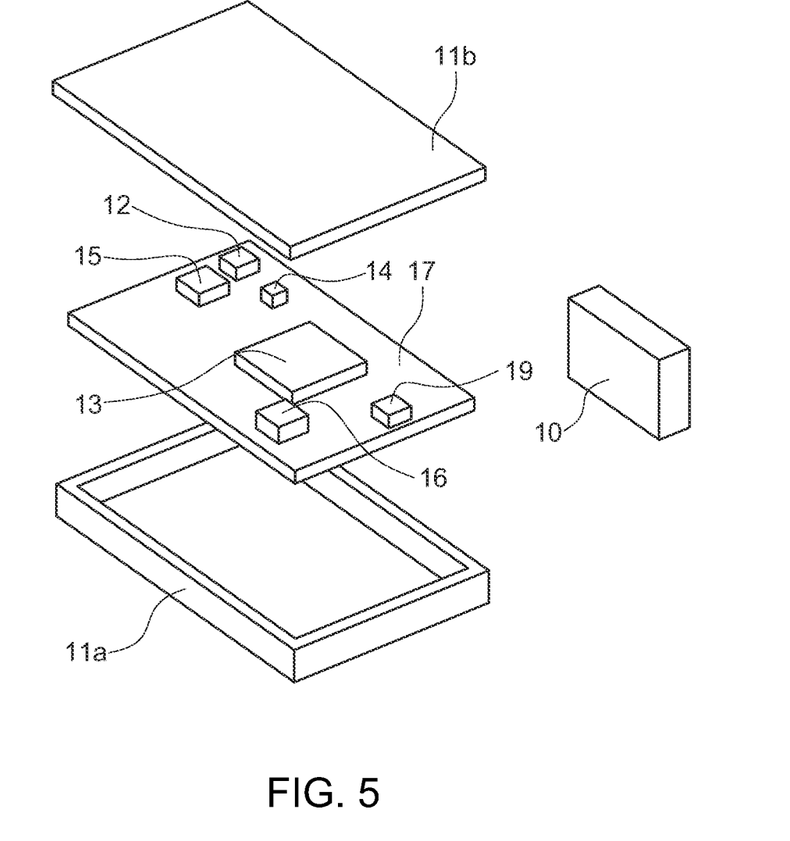
FIG. 5 shows an exploded view of an alternate embodiment.
Figure 6A:
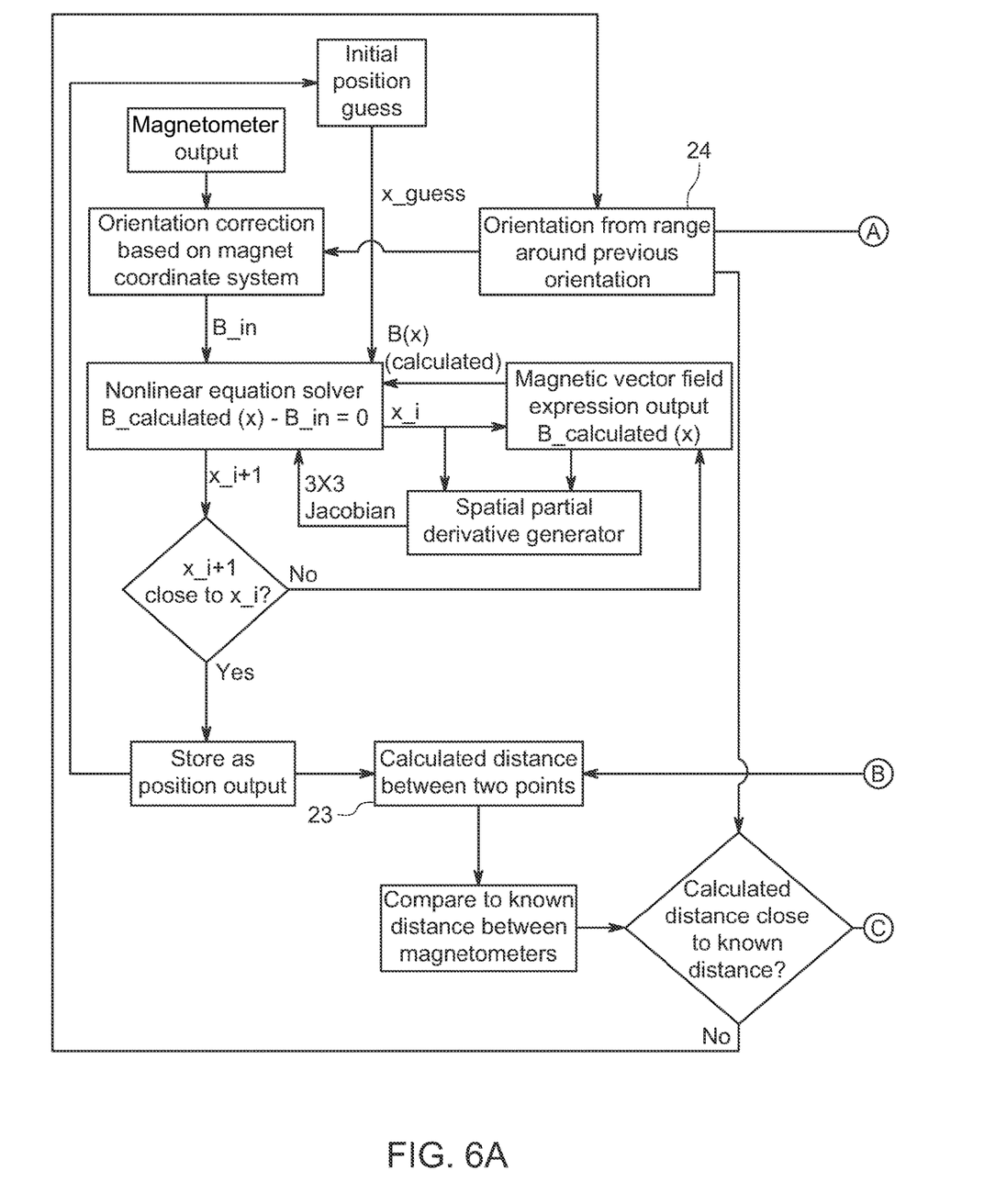
FIGS. 6a and 6b together show the block diagram detailing how the system determines an orientation from magnetometer readings at two or more locations.
Figure 6B:
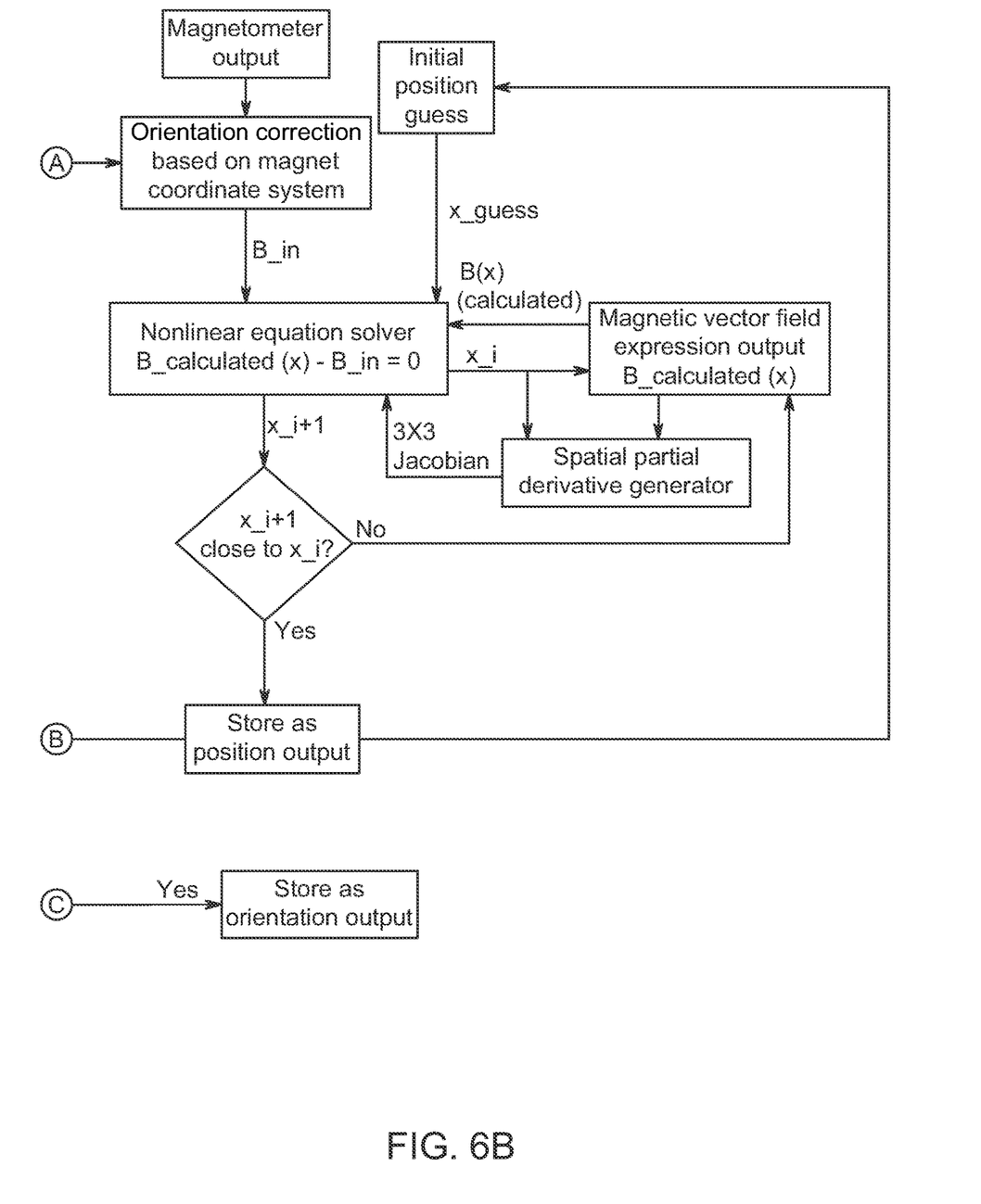

DETAILED DESCRIPTION—FIGS. 5 THROUGH 6B—ALTERNATE EMBODIMENT

An alternate embodiment includes one or more additional magnetometers 19, arranged on the printed circuit board 17 with a known, constant position relative to one-another. The position for each magnetometer is determined using the method described in the first embodiment. The Distance Calculation 23 is a module of the microprocessor that calculates the difference between any combination of position outputs. The magnetometers are rigidly attached to the printed circuit board, and as such, as the orientation of the device changes relative to a reference orientation, the orientation of each magnetometer will change by the same amount. The output from the Distance Calculation module 23 will be equivalent to the known distance between the sensors when the input reference orientation is correct. Equivalently, the input orientation can be varied until there is sufficient agreement between the calculated and known distances thereby indicating the correct reference orientation.

The invention claimed is:

1. A method for tracking motion of an object, comprising:
   a. providing a magnetic field emission means which is able to emit a predetermined magnetic field,
   b. providing a magnetic field sensing means to sense said magnetic field,
   c. providing a computational means for predicting the characteristics of said magnetic field wherein a location in the magnetic field is given as an input and the characteristics of said magnetic field at said location are taken as the output of said computational means,
   d. providing a logical means for determining the position of said magnetic sensing means in said emitted magnetic field by varying the positional input of said computational means until the output of said computational means is equivalent to the output of said magnetic field sensing means,
   whereby the positional input of said computational means is equivalent to the physical location of the magnetic field sensing means,
   e. providing an linear acceleration measurement means,
   f. providing an angular velocity measurement means,
   g. providing a computational means for determining object position and orientation using linear acceleration and angular velocity measurements, and
   h. providing a computational means for combining measurements of object motion using linear acceleration, angular velocity and magnetic positional sensing means using a Kalman filter,
   whereby the position of an object is known to a higher degree of certainty than if it were found using all three measurement means.

2. A system, comprising:
   a magnet assembly;
   at least one magnetometer that moves with a tracked object and configured to measure a three-dimensional magnetic field vector of the magnet assembly, wherein the magnet assembly is remote from the at least one magnetometer; and a processor configured to:
   receive the measured three-dimensional magnetic field vector from the magnetometer,
   generate an estimated three-dimensional magnetic field vector based on an estimated position of the tracked object,
   compare the measured three-dimensional magnetic field vector of the tracked object and the estimated three-dimensional magnetic field vector,
   generate a measured position of the tracked object where the estimated three-dimensional magnetic field vector is equal to the measured three-dimensional magnetic field vector.

3. The system of claim 2, where the magnet assembly comprises a magnet or magnets.

4. The system of claim 2, wherein the at least one magnetometer comprises a plurality of magnetometers.

5. The system of claim 4, wherein the plurality of magnetometers are arranged on a printed circuit board (PCB) with predetermined positions relative to one another.

6. The system of claim 5, wherein the processor is configured to modify the measured three-dimensional magnetic field vector to correct for estimated differences in orientation between the magnetometer and the magnet assembly.

7. The system of claim 4, wherein the processor is configured to measure an orientation of the magnetometer with respect to the magnet assembly.

8. The system of claim 4, wherein the processor is configured to determine an orientation of the at least one magnetometer with respect to the magnet assembly by modifying each output of the plurality of magnetometers until a measured distance between the plurality of magnetometers is equal to a known distance between the plurality of magnetometers.

9. The system of claim 2, wherein the magnet assembly comprises a permanent magnetic having a predetermined size, shape, and magnetization.

10. The system of claim 9, wherein the permanent magnet casts a spatially varying and determinable magnetic field in a volume surrounding the permanent magnet.

11. The system of claim 10, wherein the spatially varying and determinable magnetic field has a magnitude at a point half a meter away from a center of the permanent magnet that is several times greater than a magnetic field magnitude corresponding to Earth.

12. The system of claim 2, wherein the three-dimensional magnetic field vector generated based upon a previous known position of the tracked object is based upon at least one or more equations, one or more lookup tables, or a numerical model of the magnet assembly.

13. The system of claim 2, further comprising
an accelerometer; and
a gyroscope.

14. The system of claim 13, wherein the magnetometer is housed within an enclosure.

15. The system of claim 14, further comprising a wireless communication unit.

16. A method, comprising:
measuring a three-dimensional magnetic field vector of a magnet;
generating an estimated three-dimensional magnetic field vector based on an estimated position of the tracked object;
comparing the measured three-dimensional magnetic field vector of the tracked object and the estimated three-dimensional magnetic field vector;
generating a measured position of the magnet where the estimated three-dimensional magnetic field vector is equal to the measured three-dimensional magnetic field vector.

17. The method of claim 16, further comprising:
positioning a measurement assembly remote from the magnet; and
generating the estimated three-dimensional magnetic field vector with a processor.

18. The method of claim 17, further comprising:
modifying the measured three-dimensional magnetic field vector to correct for estimated differences in orientation between the measurement assembly and the magnet.

19. The method of claim 17, further comprising:
determining an orientation of the measurement assembly with respect to the magnet by modifying each output of a plurality of magnetometers of the measurement assembly until a measured distance between the plurality of magnetometers is equal to a known distance between the plurality of magnetometers.

20. A system, comprising:
a magnet assembly comprising a magnet or magnets;
at least one magnetometer that moves with a tracked object and configured to measure a three-dimensional magnetic field vector of the magnet assembly; and
a processor configured to:
   receive the measured three-dimensional magnetic field vector from the magnetometer,
   generate an estimated three-dimensional magnetic field vector based on an estimated position of the tracked object,
   compare the measured three-dimensional magnetic field vector of the tracked object and the estimated three-dimensional magnetic field vector,
   generate a measured position of the tracked object where the estimated three-dimensional magnetic field vector is equal to the measured three-dimensional magnetic field vector.

21. The system of claim 20, wherein the magnet assembly comprises a stack of rectangular prism magnets.

\* \* \* \* \*